United States Patent
Redlich et al.

(10) Patent No.: US 12,323,342 B2
(45) Date of Patent: *Jun. 3, 2025

(54) DEVICE AND METHOD FOR NON-CONTIGUOUS MULTIPLE RESOURCE UNIT IN A WIRELESS NETWORK

(71) Applicant: HUAWEI TECHNOLOGIES CO., LTD., Shenzhen (CN)

(72) Inventors: Oded Redlich, Hod Hasharon (IL); Shimon Shilo, Hod Hasharon (IL); Jian Yu, Shenzhen (CN); Yunbo Li, Shenzhen (CN); Genadiy Tsodik, Hod Hasharon (IL)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/818,551

(22) Filed: Aug. 28, 2024

(65) Prior Publication Data

US 2024/0421948 A1    Dec. 19, 2024

Related U.S. Application Data

(63) Continuation of application No. 17/514,901, filed on Oct. 29, 2021, now Pat. No. 12,101,263, which is a
(Continued)

(30) Foreign Application Priority Data

Apr. 30, 2019  (WO) ............... PCT/CN2019/085181

(51) Int. Cl.
*H04L 5/00* (2006.01)
*H04L 27/26* (2006.01)
*H04W 72/04* (2023.01)

(52) U.S. Cl.
CPC ........ *H04L 5/0005* (2013.01); *H04L 27/2602* (2013.01); *H04W 72/04* (2013.01)

(58) Field of Classification Search
CPC ... H04L 5/0005; H04L 27/2602; H04L 5/003; H04L 5/0039; H04L 5/0041;
(Continued)

(56) References Cited

U.S. PATENT DOCUMENTS

2016/0302200 A1* 10/2016 Yang ..................... H04L 1/0041
2017/0181136 A1*  6/2017 Bharadwaj ............. H04L 41/08
(Continued)

FOREIGN PATENT DOCUMENTS

CN    107925470 A    4/2018
CN    108702375 A    10/2018
(Continued)

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Std 802.11-2016, Total 3534 pages,Institute of Electrical and Electronics Engineers, New York, New York (Dec. 2016).
(Continued)

Primary Examiner — Rushil P. Sampat
(74) Attorney, Agent, or Firm — Leydig, Voit & Mayer, Ltd.

(57) ABSTRACT

The present disclosure suggests to expand and improve the method of utilizing channel resources in the 802.11be standard by allowing the use of multiple and non-contiguous portions of a channel. Supporting multiple resource units (MRUs) and non-contiguous resource units (RUs) improves the channel utilization by making it more efficient due to enhancing the capability of leveraging the channel selectiv-
(Continued)

ity. To this end, a wireless network device for resource allocation is provided and configured to define a non-contiguous MRU in the bandwidth of the channel. The channel includes a plurality of RUs, and the non-contiguous MRU is defined based on non-punctured RUs after puncturing one or more of the RUs of the channel, and/or is defined by aggregating two or more non-adjacent RUs of the channel.

26 Claims, 15 Drawing Sheets

Related U.S. Application Data continuation of application No. PCT/EP2020/061721, filed on Apr. 28, 2020.

(58) Field of Classification Search
CPC ............... H04L 5/0058; H04W 72/04; H04W 72/0493; H04W 72/53; H04W 72/52; H04W 72/0453
See application file for complete search history.

(56) References Cited

U.S. PATENT DOCUMENTS

| | | |
|---|---|---|
| 2017/0359824 A1 | 12/2017 | Choi et al. |
| 2018/0302858 A1 | 10/2018 | Son et al. |
| 2019/0109684 A1 | 4/2019 | Chen et al. |
| 2019/0110261 A1 | 4/2019 | Chen et al. |
| 2019/0238288 A1 | 8/2019 | Liu et al. |
| 2019/0327746 A1* | 10/2019 | Porat ................... H04L 5/0041 |
| 2019/0380117 A1 | 12/2019 | Verma et al. |
| 2020/0014509 A1* | 1/2020 | Asterjadhi ............ H04L 5/0041 |
| 2021/0409172 A1* | 12/2021 | Chen ..................... H04L 5/0007 |
| 2021/0409250 A1* | 12/2021 | Frank .................... H04W 72/21 |

FOREIGN PATENT DOCUMENTS

| | | |
|---|---|---|
| EP | 3396925 A2 | 10/2018 |
| EP | 3318030 B1 | 7/2019 |
| EP | 3567911 A1 | 11/2019 |
| JP | 2019503151 A | 1/2019 |
| KR | 20160072058 A | 6/2016 |
| KR | 20170051431 A | 5/2017 |
| KR | 20180018745 A | 2/2018 |
| WO | 2018128530 A1 | 7/2018 |
| WO | 2018152224 A1 | 8/2018 |
| WO | 2020019928 A1 | 1/2020 |

OTHER PUBLICATIONS

"Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN," IEEE P802.11ax™/D2.2, Total 620 pages (Feb. 2018).

Au, "Compendium of straw polls and potential changes to the Specification Framework Document," IEEE P802.11, Wireless LANs, Huawei, doc.: IEEE 802.11-20/0566r9, Total 6 pages, Institute of Electrical Electronics Engineers, New York, New York (Apr. 23, 2020).

U.S. Appl. No. 62/683,616 (Year: 2018).

* cited by examiner

Table 28-24—RU Allocation subfield (continued)

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01001yyyzz | 106 | | | | 26 | 26 | 26 | 26 | | 8 |
| 01010yyyzz | 106 | | | | 26 | 26 | 52 | | | 8 |
| 01011yyyzz | 106 | | | | | | 106 | | | 16 |
| 01100000 | 242-tone RU empty | | | | | | | | | 1 |
| 01110010 | 484-tone RU with zero User fields indicated in this RU Allocation subfield of the HE-SIG-B content channel | | | | | | | | | 1 |
| 01100011 | 996-tone RU with zero User fields indicated in this RU Allocation subfield of the HE-SIG-B content channel | | | | | | | | | 1 |
| 0110x1xx | Reserved | | | | | | | | | 4 |
| 01111yyzz | Reserved | | | | | | | | | 8 |
| 10yyyyzzzz | 106 | | | | 26 | | 106 | | | 64 |
| 11000yyzz | | | | | | | 242 | | | 8 |
| 11001yyzz | | | | | | | 484 | | | 8 |
| 11010yyzz | | | | | | | 996 | | | 8 |
| 11011yyzz | Reserved | | | | | | | | | 8 |
| 111xxxxxx | Reserved | | | | | | | | | 32 |

FIG. 7

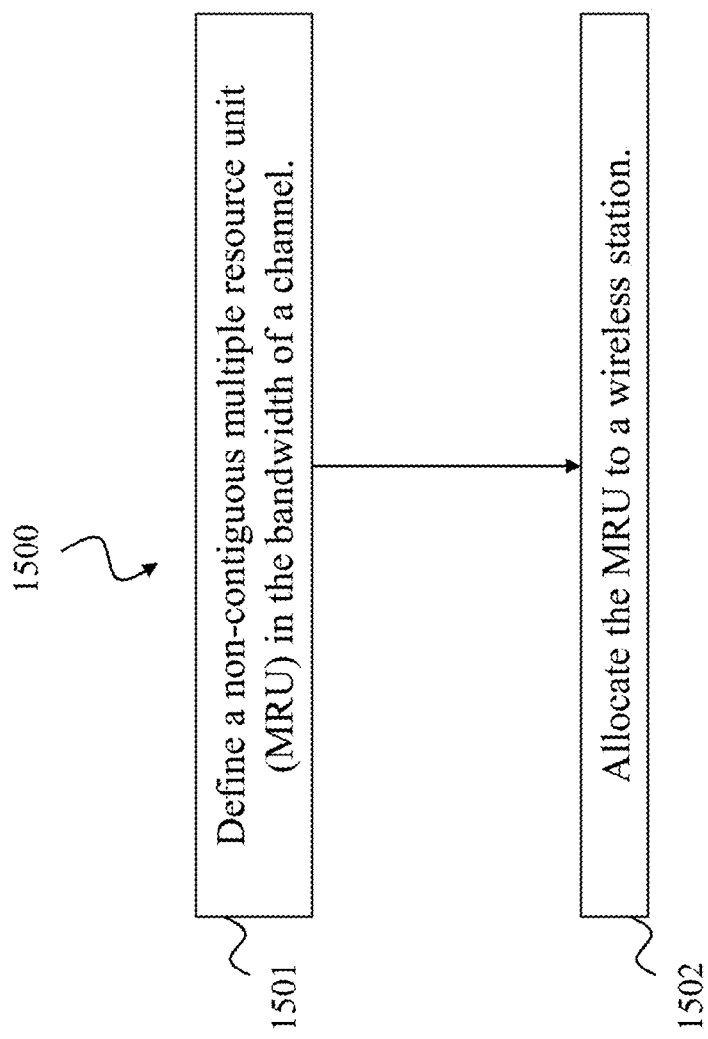

DEVICE AND METHOD FOR NON-CONTIGUOUS MULTIPLE RESOURCE UNIT IN A WIRELESS NETWORK

CROSS-REFERENCE TO RELATED APPLICATIONS

This application is a continuation of U.S. patent application Ser. No. 17/514,901, filed on Oct. 29, 2021, which is a continuation of International Application No. PCT/EP2020/061721, filed on Apr. 28, 2020, which claims priority to International Patent Application No. PCT/CN2019/085181, filed on Apr. 30, 2019. All of the afore-mentioned patent applications are hereby incorporated by reference in their entireties.

TECHNICAL FIELD

The present disclosure relates to the communications field, and in particular, to a method and a wireless network device related to non-contiguous resource units (RUs) for the 802.11be standard. In particular, the disclosure provides a wireless network device for resource allocation. The wireless network device is configured to define a non-contiguous multiple resource unit (MRU), and to allocate the MRU to a wireless station. The wireless network device may be compatible with the 802.11ax standard or 802.11be standard, i.e., it may be referred to as a Wi-Fi device.

BACKGROUND

In the current 802.11ax standard, RUs with several sizes are defined, wherein each RU consists of contiguous frequency tones (except for rare cases regarding the middle small RU).

In particular, in the current 802.11ax standard there are 6 different sizes of RUs. In a resource allocation process, a scheduler, e.g. an Access Point (AP), can allocate only a single RU to a given wireless station (STA) for a PPDU transmitted to more than one user (MU-PPDU) transmission. That is, each non-AP STA is limited to being allocated a single RU. This means that the AP may allocate only a single RU to each of potentially multiple associated STAs, even if there exist available and non-occupied RUs. This limitation makes the resource allocation process inefficient, especially when channel puncturing is to be applied, and/or when the channel is relatively selective (i.e., the best RUs of a given STA are not necessarily close in the frequency domain).

Further, when a transmission is done for a single STA using a single-user PPDU (i.e., for a SU-PPDU transmission), then in the 802.11ax standard it is mandatory that the signal occupies the entire bandwidth (BW) of the channel, more specifically, the entire available BW. This means that for SU-PPDU there is no relevancy to RU.

A particular disadvantage in the case of MU-PPDU transmission is, consequently, that in case a selective channel exists, where there may be multiple and non-contiguous portions of the channel that experience a relatively high Signal-to-Noise Ratio (SNR), only one of these portions may be used. For example, as is depicted in FIG. 1, the highest SNR for a given non-AP STA may be achieved in RU #1, RU #3 and RU #8, however, the AP can transmit to this STA on only one of these RUs.

A particular disadvantage in the case of SU-PPDU transmission is, consequently, that if a portion of the channel is busy (e.g., the portion is used by an Overlapping Base Station Service (OBSS)), then the transmission is reduced to a smaller BW. For example, as is shown in FIG. 2, a portion of the channel (surrounded by the box) may be taken by an OBSS, thus, it is not available for the SU-PPDU transmission. In this case, a transmission of the SU-PPDU is limited to the two left free channels. Although the right channel is also free, it cannot be used.

SUMMARY

Embodiments of the disclosure are further based on the following considerations.

In the current 802.11ax standard, Orthogonal Frequency-Division Multiplexing Access (OFDMA) modulation was first introduced. The standard limits each non-AP STA to use a single RU comprised of contiguous frequency tones (e.g., comprised of contiguous sub-carriers). Although there are various different RU sizes defined in the current standard (26, 52, 106, 242, 484, 996 frequency tones, respectively), restricting the allocation to a single RU makes the dealing with the selective channel non-efficient.

In particular, for a channel BW smaller than 20 MHz, there are defined RUs with 26 tones, 52 tones, and 102 tones. For a channel BW equal to or larger than 20 MHz, there are defined RUs with 242 tones (20 MHz), 484 tones (40 MHz), 996 tones (80 MHz), or 2×996 tones (160 MHz). Further, also RUs with size bigger than 2×996, e.g. 2×1992 tones (for 320 MHZ), are envisaged for Extreme High Throughput (EHT). Combinations of those RUs, in particular, combinations of RUs having different sizes (numbers of frequency tones), is not possible or envisaged in the current standard.

In view of the above-mentioned disadvantages and considerations, embodiments of the present disclosure aim to improve resource allocation in a wireless network. An objective is to allow non-contiguous MRUs to be defined in the BW of a channel. Consequently, a goal is to improve the utilization of the channel. However, another aim is to avoid too many changes to the current 802.11ax standard.

The objective is achieved by the embodiments of the disclosure as described in the enclosed independent claims. Advantageous implementations of the embodiments of the disclosure are further defined in the dependent claims.

In particular, embodiments of the disclosure allow allocation of an MRU to the same STA, while the RUs (RU structure(s)) of the current standard may be kept.

A first aspect of the present disclosure provides a wireless network device, in particular a Wi-Fi device, for resource allocation, the wireless network device being configured to: define a non-contiguous multiple resource unit, MRU, in the bandwidth of a channel; wherein the channel comprises a plurality of resource units, RUs, and wherein the MRU is defined based on non-punctured RUs after puncturing one or more of the RUs of the channel and/or is defined by aggregating two or more non-adjacent RUs of the channel; and allocate the MRU to a wireless station.

The wireless network device of the first aspect allows defining the MRU based on multiple RUs. These RUs may each be as defined in the current 802.11ax standard, i.e., each RU may comprise a number of frequency tones or sub-carriers. The MRU definition also supports channel puncturing, in that a punctured "larger RU" (e.g., the entire channel or a channel segment, comprising multiple RUs) can be used as the MRU. Further, the MRU can be allocated to the wireless station (STA), i.e., STAs are not limited anymore to being allocated a single RU as in the 802.11ax standard.

The wireless network device may in addition be configured to define and allocate also a contiguous MRU to the STA, wherein the contiguous MRU comprises a plurality of differently sized RUs (e.g., at least two RUs of the MRU comprise a different number of frequency tones). The wireless network device may in addition be configured to further also allocate a single RU to the STA. That is, the wireless network device may be compatible with the current 802.11ax standard.

In an implementation form of the first aspect, the RUs are sub-channels.

For instance, the channel may be an 80 MHz, 160 MHz, 240 MHz, or 320 MHz channel, and the sub-channels may have a bandwidth of 20 MHz and/or 40 MHz.

In an implementation form of the first aspect, the channel comprises one, two, three or four 80 MHz segments, and each 80 MHz segment comprises four 20 Mhz sub-channels.

That is, generally, the channel may be divided into a plurality of channel segments.

In other implementations, the channel may also comprise one 80 MHz segment and one 160 MHz segment or, respectively, may comprise two 160 MHz segments. This is similar to three or four 80 MHz segments, but not identical, because the standard may define that there cannot be three or four standalone 80 MHz segments. Thus, if the BW is 240 MHz, then it may be mandatory that one segment is a contiguous 160 MHz segment. If the BW is 320 MHz, then it may be mandatory to use two segments, wherein each is 160 MHz (contiguous).

In an implementation form of the first aspect, the RUs each comprise a plurality of contiguous frequency tones.

In an implementation form of the first aspect, the frequency tones each have a 78.125 kHz bandwidth.

In an implementation form of the first aspect, each RU comprises 26, 52, 106, or 242 frequency tones.

Thus, the RUs may be RUs as defined in the 802.11ax standard.

In an implementation form of the first aspect, the wireless network device is further configured to aggregate two or more RUs, which comprise a different numbers of frequency tones.

The RUs may thereby be adjacent or non-adjacent in the channel BW, in particular, in a channel segment. Aggregating differently sized RUs is enabled, and is not possible in the 802.11ax standard.

In an implementation form of the first aspect, the MRU comprises at least two contiguous and/or non-contiguous parts, the parts having different bandwidths.

An MRU, as defined and allocated to the STA by the wireless network device may, in contrast to e.g. the 802.11ax standard, be non-contiguous. However, the wireless network device may also define and allocate a contiguous MRU to the STA. Generally, an MRU may thus comprise more than one RU. Each RU may thereby be defined by its number of frequency tones, as described above, e.g., 26, 52, 106, 242, and so on. Thus, for example, an MRU may be defined by two RUs with 106 tones and 26 tones, respectively, i.e. in total 132 frequency tones. There is no definition the current 802.11ax standard for a RU with 132 frequency tones. The only way to have a RU with 132 tones (generally an MRU can also be considered a RU comprising multiple sub-RUs) is to combine such two RUs. In the given example, the RU with 106 frequency tones and the RU with 26 frequency tones may be either contiguous or non-contiguous.

In an implementation form of the first aspect, the wireless network device is further configured to transmit a packet to the wireless station utilizing the determined MRU.

In an implementation form of the first aspect, a preamble of the packet comprises information indicating, for transmitting the packet to the wireless station utilizing the determined MRU, the RUs that are used and/or the non-punctured RUs and/or the punctured RUs.

Thus, the STA is aware of the used RUs, i.e., also the definition and allocation of the MRU.

In an implementation form of the first aspect, the packet is a physical layer conformance procedure (PLCP) protocol data unit (PPDU), and the information is included in a Universal Signaling (U-SIG) or EHT Signaling (EHT-SIG) field of the preamble of the PPDU.

The PPDU may be a MU-PPDU or a SU-PPDU.

In an implementation form of the first aspect, the packet is a MU-PPDU; and the EHT-SIG field of the MU-PPDU comprises a sub-field for each of one or more wireless stations, and the information is included in the sub-field associated with the wireless station to which the packet is transmitted utilizing the determined MRU.

In an implementation form of the first aspect, the packet is a SU-PPDU or MU-PPDU; and the information is included as a bitmap in the U-SIG field of the SU-PPDU or MU-PPDU.

In an implementation form of the first aspect, the wireless network device is an access point of a Wi-Fi network.

That is, the wireless network device is configured according to a Wi-Fi standard, in particular, according to the 802.11ax or 802.11be standard.

A second aspect of the present disclosure provides a method for resource allocation, the method comprising: defining a non-contiguous multiple resource unit, MRU, in the bandwidth of a channel; wherein the channel comprises a plurality of resource units, RUs, and wherein the MRU is defined based on non-punctured RUs after puncturing one or more of the RUs of the channel and/or is defined by aggregating two or more non-adjacent RUs of the channel; and allocating the MRU to a wireless station.

In an implementation form of the second aspect, the RUs are sub-channels.

In an implementation form of the second aspect, the channel comprises one, two, three or four 80 MHz segments, and each 80 MHz segment comprises four 20 Mhz sub-channels.

In an implementation form of the second aspect, the RUs each comprise a plurality of contiguous frequency tones.

In an implementation form of the second aspect, the frequency tones each have a 78.125 kHz bandwidth.

In an implementation form of the second aspect, each RU comprises 26, 52, 106, or 242 frequency tones.

In an implementation form of the second aspect, the method further comprises aggregating two or more RUs, which comprise a different numbers of frequency tones.

In an implementation form of the second aspect, the MRU comprises at least two contiguous and/or non-contiguous parts, the parts having different bandwidths.

In an implementation form of the second aspect, the method further comprises transmitting a packet to the wireless station utilizing the determined MRU.

In an implementation form of the second aspect, a preamble of the packet comprises information indicating, for transmitting the packet to the wireless station utilizing the determined MRU, the RUs that are used and/or the non-punctured RUs and/or the punctured RUs.

In an implementation form of the second aspect, the packet is a physical layer conformance procedure, PLCP, protocol data unit, PPDU, and the information is included in a Universal Signaling, U-SIG, or Extremely High Throughput Signaling, EHT-SIG, field of the preamble of the PPDU.

In an implementation form of the second aspect, the packet is a multi-user PPDU; and the EHT-SIG field of the multi-user PPDU comprises a sub-field for each of one or more wireless stations, and the information is included in the sub-field associated with the wireless station to which the packet is transmitted utilizing the determined MRU.

In an implementation form of the second aspect, the packet is a single-user PPDU or multi-user PPDU; and the information is included as a bitmap in the U-SIG field of the single-user PPDU or multi-user PPDU.

In an implementation form of the second aspect, the method is performed by a wireless network device, in particular, an access point of a Wi-Fi network.

The method of the second aspect and its implementation forms achieve all advantages and effects of the wireless network device according to the first aspect and its respective implementation forms.

A third aspect of the present disclosure provides a computer program comprising a program code for performing, when running on a computer, the method according to the second aspect or any implementation form thereof.

A fourth aspect of the present disclosure provides a non-transitory storage medium storing executable program code which, when executed by a processor, causes the method according to the second aspect or any of its implementation forms to be performed.

A fifth aspect of the present disclosure provides a method comprising, particularly in 802.11be: defining a non-contiguous resource unit, which is an aggregation of multiple single resource units, wherein each of the single resource units comprises a group of contiguous sub-carriers, e.g. the RUs defined in 802.11ax, which may be not-contiguous in the frequency domain.

In an implementation form of the fifth aspect, the multiple non-contiguous RUs may be of different sizes.

A sixth aspect of the present disclosure provides a second method comprising: defining a non-contiguous RU by using a single punctured RU, wherein its non-punctured portions may be seen as multiple separated (non-contiguous) RUs.

A seventh aspect of the present disclosure provides a transmission of a signal, wherein the transmission utilizes the methods of the second aspect or any of its implementation forms, the fifth aspect or its implementation form, or the sixth aspect, respectively, using non-contiguous RUs at the same time.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware.

BRIEF DESCRIPTION OF DRAWINGS

The above described aspects and implementation forms will be explained in the following description of specific embodiments in relation to the enclosed drawings, in which

FIG. 7 shows an example of a RU allocation subfield included in a preamble of a packet.

FIG. 15 shows a method according to an embodiment of the disclosure.

DETAILED DESCRIPTION OF EMBODIMENTS

Figure 3:
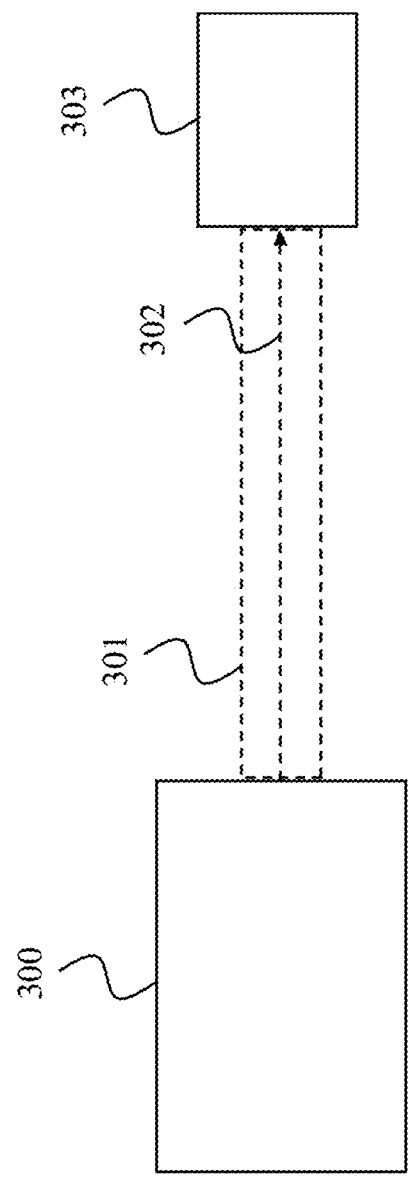
FIG. 3 shows a wireless network device according to an embodiment of the disclosure.

FIG. 3 shows a wireless network device 300 according to an embodiment of the disclosure. The wireless network device 300 is suitable for resource allocation, e.g. to a STA 303, in a wireless network. The wireless network device 300 may be a Wi-Fi device, e.g. according to the 802.11ax standard or the 802.11be standard. In particular, the wireless network device 300 may be an AP of the wireless network.

The wireless network device 300 may comprise a processor or processing circuitry (not shown) configured to perform, conduct or initiate the various operations of the wireless network device 300 described herein. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors.

The wireless network device 300 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the wireless network device 300 to be performed.

In one embodiment, the processing circuitry comprises one or more processors and a non-transitory memory connected to the one or more processors. The non-transitory memory may carry executable program code which, when executed by the one or more processors, causes the wireless network device 300 to perform, conduct or initiate the operations or methods described herein.

Figure 4:
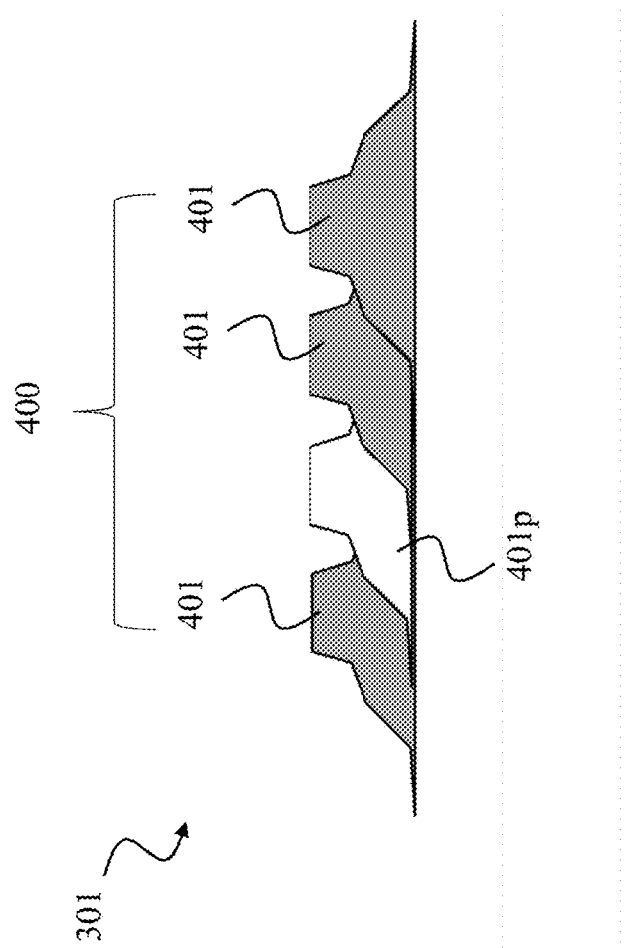
FIG. 4 shows an MRU defined by the wireless network device of FIG. 3.

The wireless network device 300 is configured to define a non-contiguous MRU 400 in the bandwidth of a channel 301, and to further allocate the MRU 400 to the STA 303. FIG. 4 shows an example of such an MRU 400 as defined by the wireless network device 300 of FIG. 3. The channel 301 comprises a plurality of RUs 401, e.g. sub-channels. Each RU 401 may comprise frequency tones. Different RUs may comprise the same or a different number of frequency tones.

The wireless network device 300 may define the MRU 400 either based on non-punctured RUs 401 of the channel 310—after puncturing one or more of the RUs 401 of the channel 301, i.e. obtaining one or more punctured RUs 401p—and/or by aggregating two or more non-adjacent RUs 401 of the channel 301 (in this case, the RUs 401p are not-aggregated/left-out RUs when defining the MRU 400).

The wireless network device 300 may further be configured to transmit a packet 302 to the STA 303 over the channel. This transmission may utilize the MRU 400. The MRU 400 definition may be indicated to the STA 303 by the packet 302, e.g., in a preamble of the packet 302.

Notably, in the present disclosure the notation "MRU" (the aggregated RUs 401 or a punctured set of RUs 401, e.g., in the channel 301 or in a channel segment), and "RU" (e.g., the smallest frequency resource that can be allocated in the channel) are used. However, other notations may be used. For instance, the "MRU" may be referred to as a "larger RU" and the "RUs" as "smaller RUs". For example, the MRU 400 defined "based on non-punctured RUs 401 after puncturing one or more of the RUs" may also be referred to as a "large RU with some unavailable channels/tones", wherein the "channels/tones" are the RUs 401. Further, the MRU defined by "aggregating two or more non-adjacent RUs 401" may also be referred to as "an aggregation of two channels", wherein a "channel" is an RU 401. All notations result the same technical result. Thus, embodiments of the disclosure should not be limited by the used notation.

Further, the present disclosure also uses the notation "channel" (overall BW), and sometimes refers to "channel segment" (e.g., a logical separation of the channel BW), and sometimes refers to "sub-channel" (e.g., the smallest frequency resource in the channel, i.e. the RU 401). However, other notations may be used. For instance, the "sub-channels" may also be referred to as "channels" that are included in a certain BW. Thus, embodiments of the disclosure should also not be limited by these used notation.

In an example, the channel 301 may be an 80 MHz channel, and may comprise four 20 MHz sub-channels 401. For defining the MRU 400, a punctured 20 MHz portion of the channel 301 may be defined, i.e., one sub-channel 401 of the channel 301 may be a punctured/left-out sub-channel 401p.

The remaining 60 MHz (three non-punctured RUs/sub-channels 401) of the MRU 400 in the channel 301 may be regarded as either as one "larger RU" (MRU 400) with some unavailable/punctured sub-channels/channels/tones (alternative 1), or as an aggregation of two RUs/sub-channels/channels (e.g. 20 MHz+40 MHz) to form a "larger RU" (MRU 400) (alternative 2). Both alternatives 1 and 2 are not supported in the current 80211ax standard. For allocating the MRU 400 in the channel 301 to a single user (e.g., either as part of a MU-PPDU that is transmitted over a larger BW, or as an 80 MHz SU-PPDU), both of the above alternatives 1 and 2 may be considered.

In the following, alternative 1 is described in more detail, i.e., an embodiment of the wireless network device 300 is described, wherein the wireless network device 300 may at least use the alternative 1 to define the MRU 400 in the BW of the channel 301.

Figure 5:
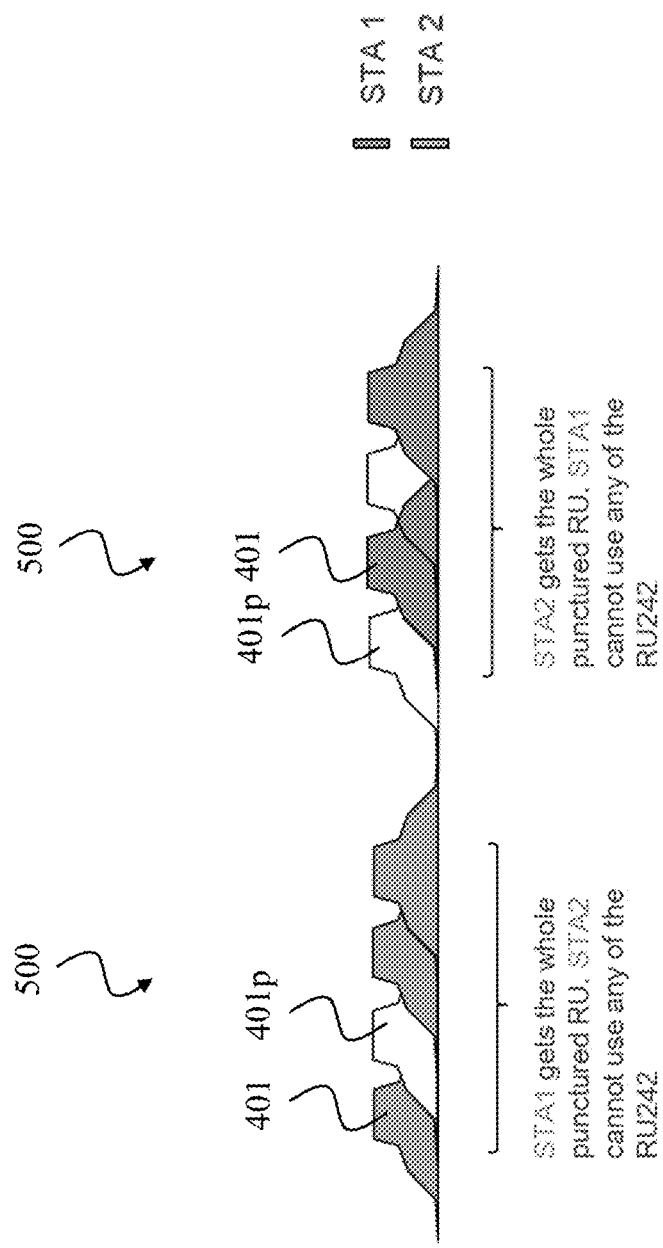
FIG. 5 shows a first alternative for defining a non-contiguous MRU, which may be performed by a wireless network device according to an embodiment of the disclosure.

The MRU 400 is enabled to be a punctured "larger RU" as shown in FIG. 5. In particular, FIG. 5 shows a case for MU-PPDU, wherein the MRU 400 may be defined by multiple RUs 401 in the BW of the channel 301, wherein some RUs 401p in the BW of the channel 301 are punctured. The channel 301 may notably comprises more than one channel segment 500. Further, different MRUs 400 for different STAs (STA 1 and STA 2 in FIG. 5) may be defined in the channel BW, e.g., in different channel segments 500. For example, in FIG. 5, a STA 1 gets the whole punctured first channel segment 500, wherein a STA 2 cannot use any of the RUs 401 in the first channel segment 500 (left side). Further, the STA 2 gets the whole punctured second channel segment 500, wherein the STA 1 cannot use any of the RUs 401 in the second channel segment 500 (right side). The RUs 401 may exemplarily all comprise the same number, e.g. 242, frequency tones.

Defining the MRU 400 is this way may mean that a single user-field per STA (here for STA 1 and 2) in the SIG-B field or U-SIG field (of a preamble of the transmitted packet 302, e.g., MU-PPDU) may be required, similarly to the 802.11ax standard. However, the RU granularity may be limited, i.e., multiple STAs 303 may not be able to coexist in the same MRU 400 in a non-MU-MIMO (Multiple Input Multiple Output) allocation.

Figure 6:
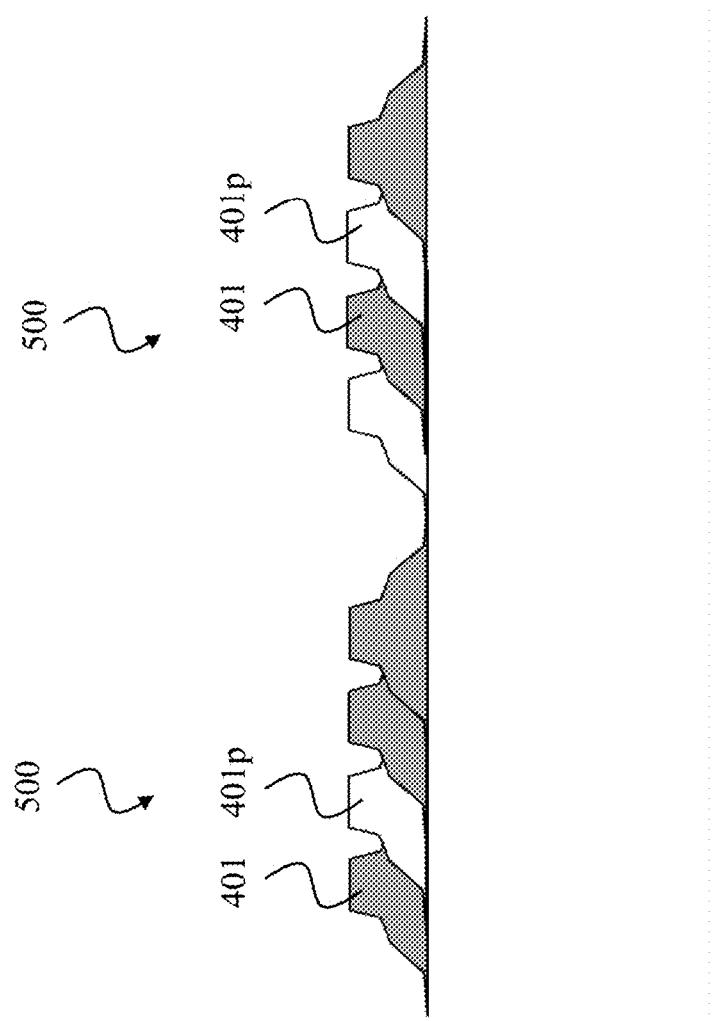
FIG. 6 shows a second alternative for defining a non-contiguous MRU, which may be performed by a wireless network device according to an embodiment of the disclosure.

Alternative 1 may also be used for SU-PPDU and supports puncturing, as shown in FIG. 6. Here, the alternative 1 yields significant improvement in channel utilization. Notably, SU-PPDU with puncturing is not supported in the current 802.11ax standard, but is assumed to be added in the 802.11be standard.

In order to enable this type of non-contiguous MRU 400 as part of the 802.11be standard, the RU allocation subfield of SIG-B or U-SIG should be modified/designed to support:
1. 1992-RU and 3984-RU (i.e., MRUs 400).
2. 16 SS for any RU>=106 (i.e., MRUs 400)
3. Empty 242-RU as part of a larger RU (i.e., MRU 400).

In the 802.11ax standard, in the RU Allocation subfield in the preamble of a packet 302, there is not enough room to support (1) and (2) above, but in the 802.11be standard, it may be modified/designed to address this issue. In this disclosure (3) above is dealt with.

Figure 8:
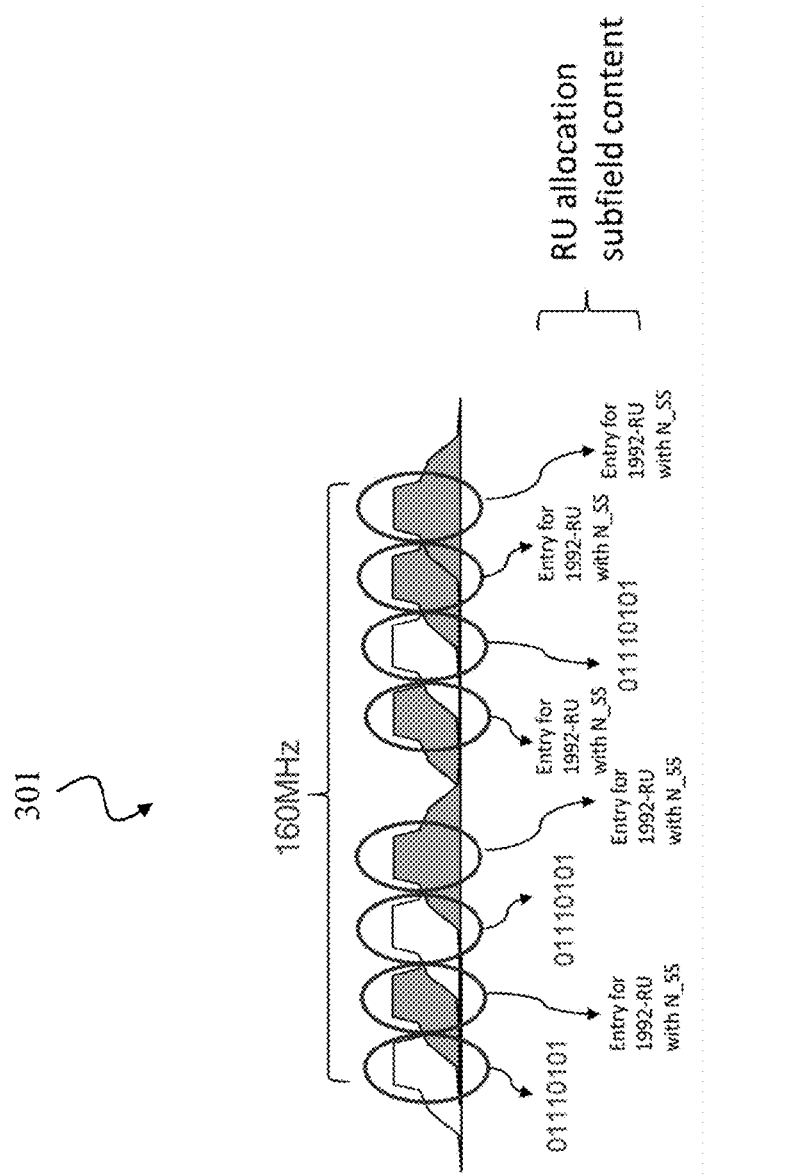
FIG. 8 shows an example of signaling a non-contiguous MRU.

New entries may be added in the RU Allocation subfield (SIG-B or U-SIG) to indicate a punctured 242-MRU that is a portion of a channel 301 or channel segment 500 (may be referred to as a "larger RU" or "wider RU"). For instance, the field content 011101×1×0 may be used to indicate an empty 242-tone MRU that is a part of a 996/1992/3984 RU as shown in FIG. 7. For instance:
 a. 01110100—empty 242—tone RU as part of 996-RU
 b. 01110101—empty 242—tone RU as part of 1992-RU
 c. 01110110—empty 242—tone RU as part of 3984-RU
 d. 01110111—reserve FIG. 8 shows an example of signaling a non-contiguous MRU 400, in particular, a non-contiguous MRU 400 of size 160 MHz (1992-RU) using the above procedure.

In MU-PPDU, the content of B7-B0 of the RU allocation subfield (SIG-B or U-SIG) for each content channel together with the STA-ID field (identification of the STA 303) in the user-specific field determine the punctured 1992 MRU structure and the STA 303 that got it. In SU-PPDU, the non-contiguous MRU 400 structure may be enabled by leveraging the puncturing method that will be defined in the 802.11be standard.

Figure 9:
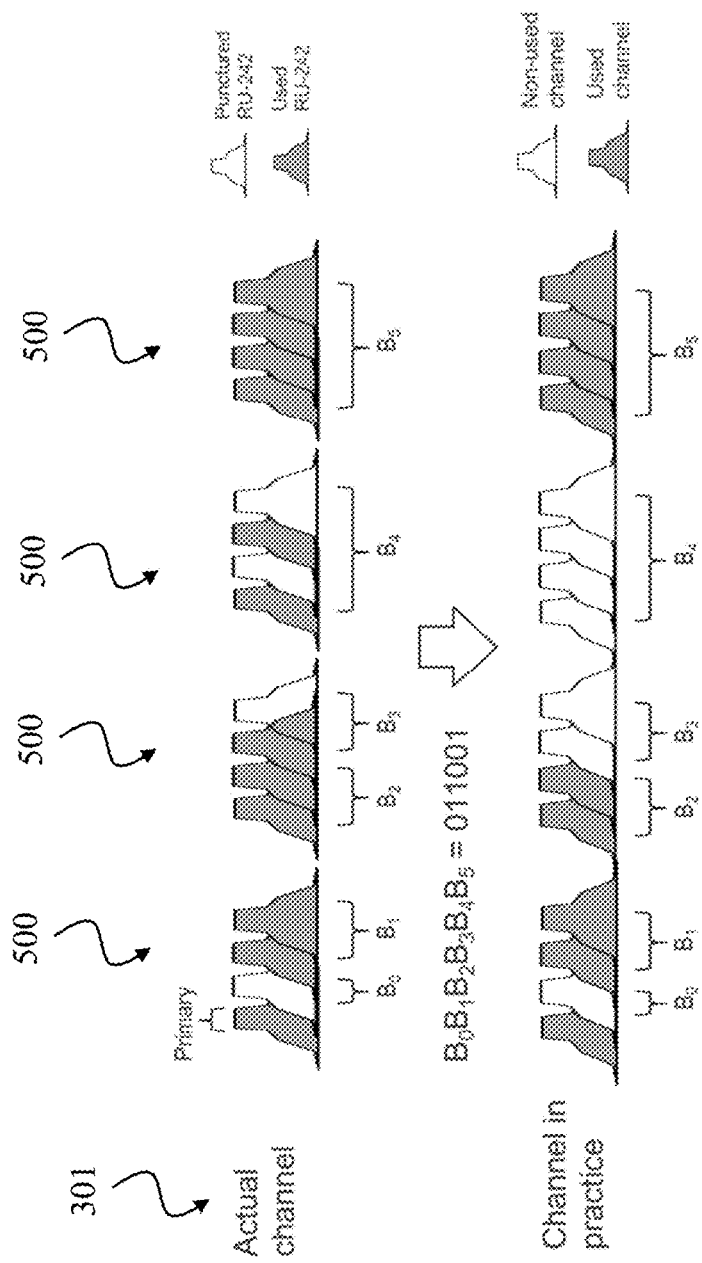
FIG. 9 shows an example of signaling and using a non-contiguous MRU for SU-PPDU.

For example, as shown in FIG. 9, the puncturing method may employ a bitmap B0 . . . B5 that determines which portions of the channel 301 are actually used in the SU-PPDU, according to the availability of the various RU-242's. This puncturing method is just an example.

In the following, alternative 2 is described in more detail, i.e., an embodiment of the wireless network device 300 is described, wherein the wireless network device 300 may at least use the alternative 2 to define the MRU 400 in the BW of the channel 301.

Figure 1:
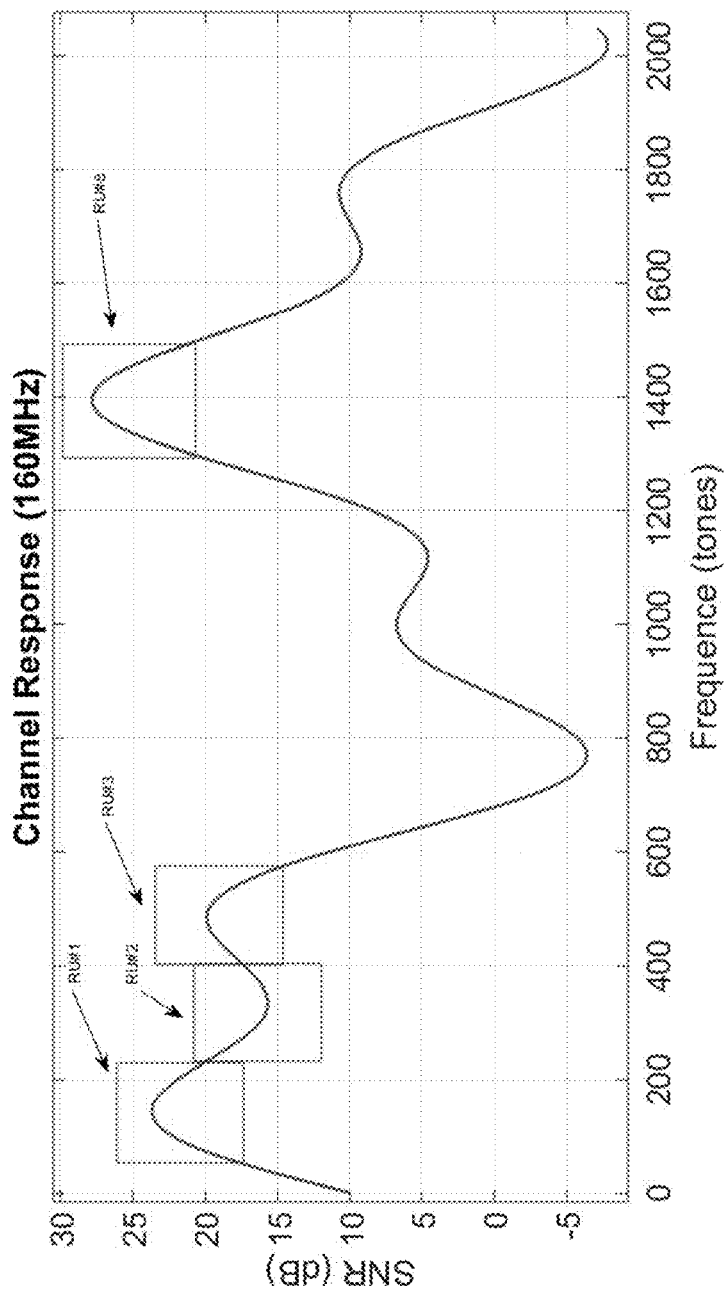
FIG. 1 shows a selective channel with non-contiguous high Signal-to-Noise-Ratio (SNR) portions.
Figure 2:
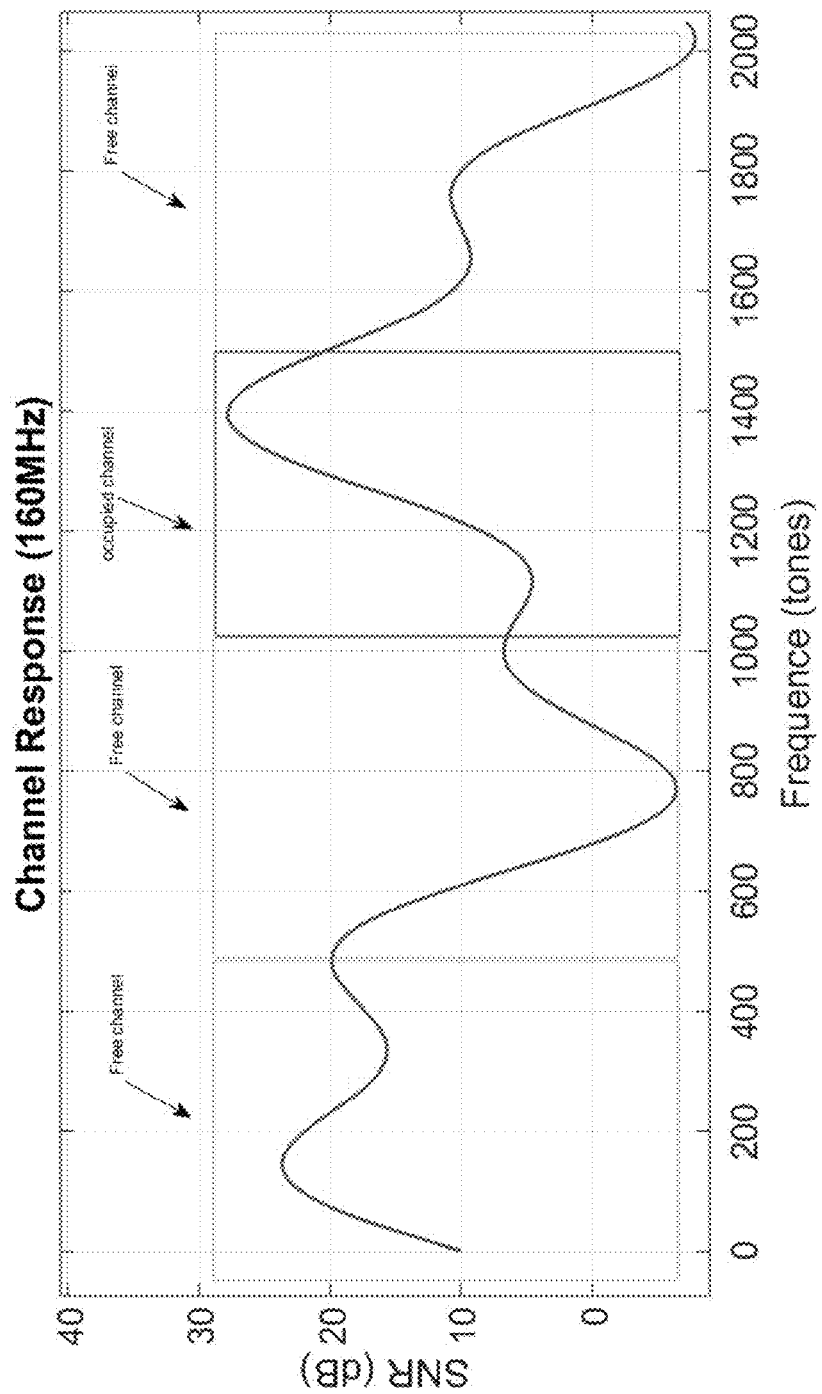
FIG. 2 shows a SU-PPDU when a portion of the channel is busy.

In this alternative 2, it is allowed to allocate multiple RUs 401 to the same STA 303, contrary to the current 802.11ax standard, which limits the number of RUs per STA 303 to one. Allowing multiple RUs 401 per STA 303 means that the limitation is increased to more than one, i.e. a specific limitation may be defined. Defining more than one RU 401 to the same STA 303 means that the allocation process is more flexible, and it also increases the frequency diversity and by that it solves the problem illustrated in FIG. 1.

Figure 10:
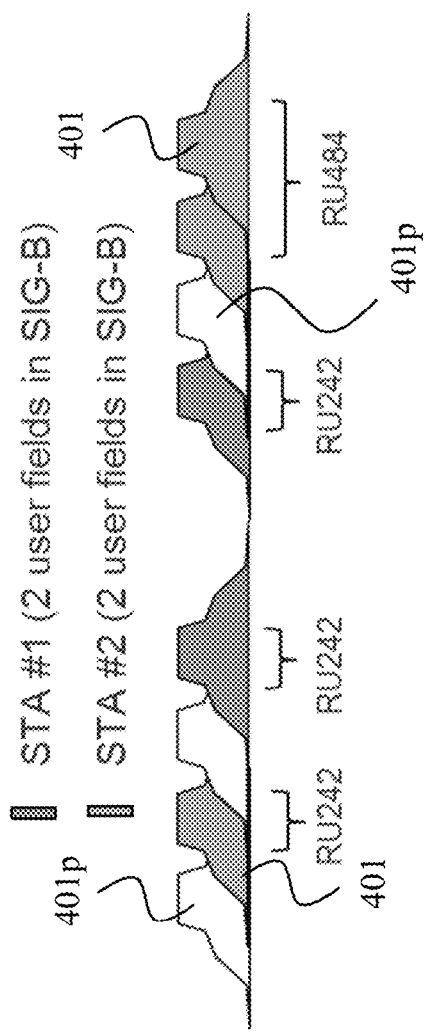
FIG. 10 shows a first example of aggregation for defining a non-contiguous MRU, and allocating it to the same STA.
Figure 11:
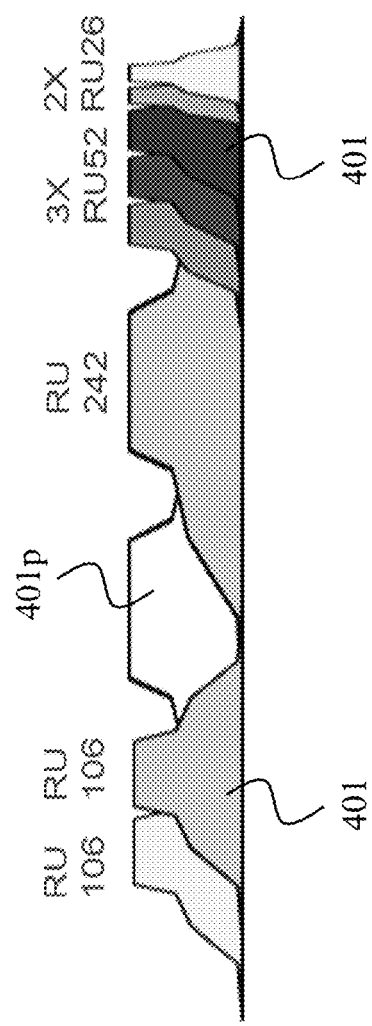
FIG. 11 shows a second example of aggregation for defining a non-contiguous MRU, and allocating it to the same STA.

An example, for how to aggregate multiple RUs 401 to an MRU 400, in particular, multiple MRUs 400 to multiple STAs 303 is given in FIG. 10. In particular, alternative 2 allows aggregating RUs 401 of any size, i.e., of any number of frequency tones, as illustrated in FIG. 11. In this example, and MRU 400 for one STA 303 is an aggregation of a RU 401 with 106 frequency tones (the left-most RU 401 in the figure) and a RU 401 with 26 frequency tones (the right-most RU 401 in the figure).

In order to enable such RU 401 aggregation of any size, the following parameters may be defined in the 802.11ax standard:

$$N_{CBPS,u} = \sum_{n=1}^{N_{RU,u}} N_{CBPS,u,n}$$

$$N_{CBPSS,u} = \sum_{n=1}^{N_{RU,u}} N_{CBPSS,u,n}$$

$$N_{DBPS,u} = \sum_{n=1}^{N_{RU,u}} N_{DBPS,u,n}$$

$$N_{SD,u} = \sum_{n=1}^{N_{RU,u}} N_{SD,u,n}$$

$$N_{SP,u} = \sum_{n=1}^{N_{RU,u}} N_{SP,u,n}$$

$$N_{ST,u} = \sum_{n=1}^{N_{RU,u}} N_{ST,u,n}$$

$N_{RU,u}$ is the number of RUs 401 allocated to a user (STA) denoted u).

Figure 12:
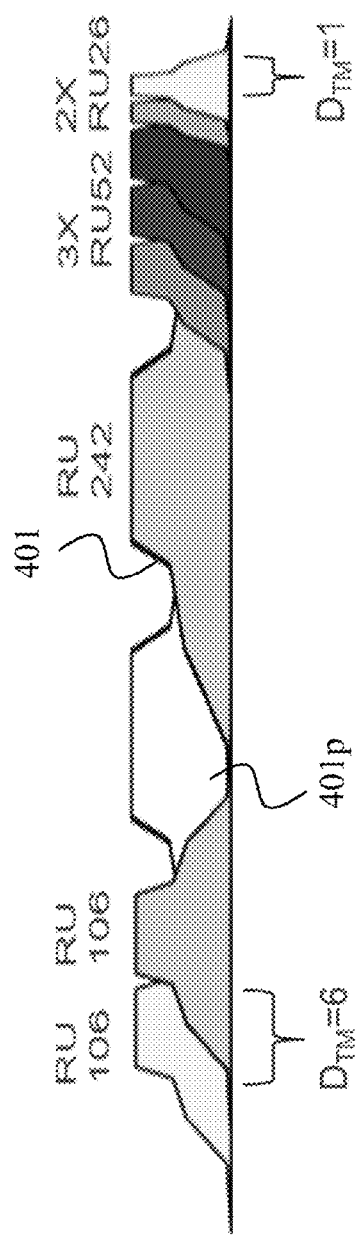
FIG. 12 shows the second example of aggregation for defining a non-contiguous MRU, and allocating it to the same STA.

A tone mapping distance parameter (DTM) may be maintained for each RU 401, separately. For example, consider the left-most and the right-most RUs 401 in FIG. 12, which are allocated to the same STA 303 (e.g., u=1, $N_{RU,u}$=2, MCS3). In this, for example:

$$N_{SD,1} = N_{SD,u,1} + N_{SD,u,2} = 102 + 24 = 126$$

$$N_{CBPS,1} = N_{CBPS,u,1} + N_{CBPS,u,2} = 408 + 96 = 504$$

$$N_{DBPS,1} = N_{DBPS,u,1} + N_{DBPS,u,2} = 204 + 48 = 252$$

Figure 13:
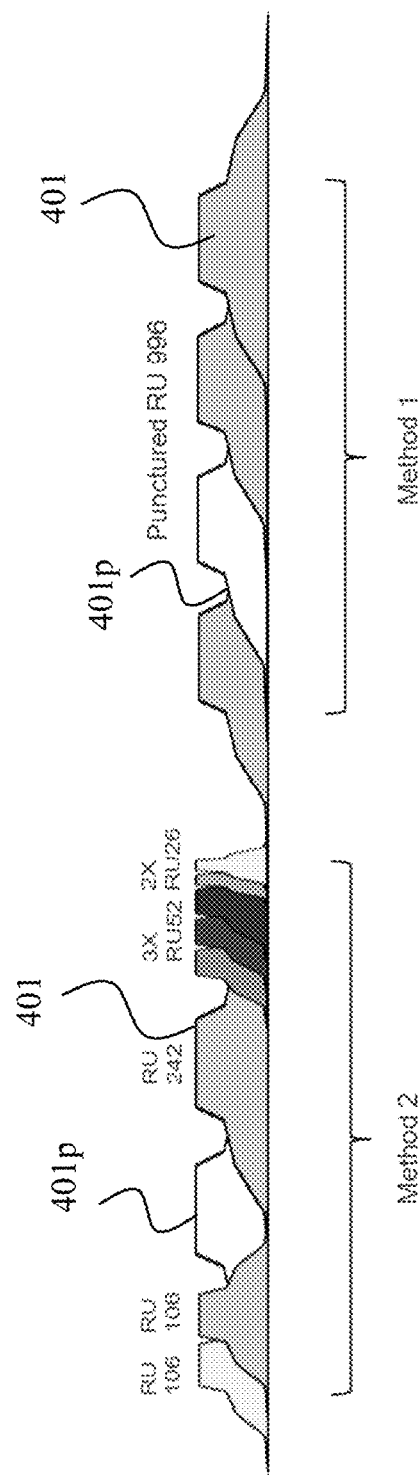
FIG. 13 shows an example of using both alternatives for defining a non-contiguous MRU separately at the same time.
Figure 14:
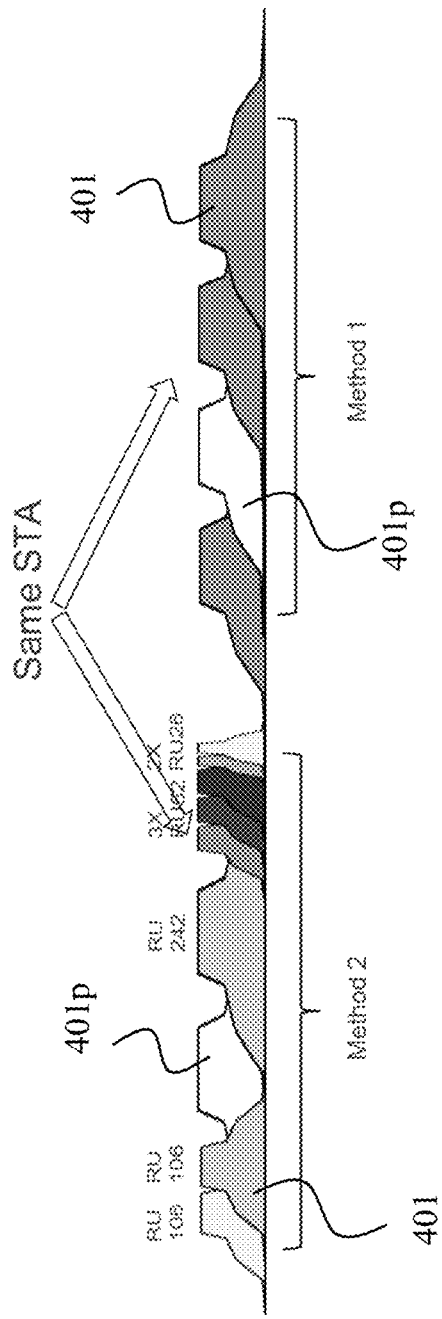
FIG. 14 shows an example of using both alternatives for defining a non-contiguous MRU in a mixed format.

It is also possible that the two alternatives 1 and 2 coexist, i.e., a wireless network device 300 according to an embodiment of the disclosure may be configured to define a MRU 400 according to both alternatives (at the same time). In particular, the two alternatives 1 and 2 may coexist (i.e., may be used at the same time) either separately or mixed. "Separately" means that a given STA uses a non-contiguous MRU 400 defined by employing one alternative of the above in a first portion of the channel 301, while a second STA uses a non-contiguous MRU 400 defined by the other alternative 2 in a second, separate portion of the channel 301. This is illustrated in FIG. 13. "Mixed" means that a given STA may have an allocation of a MRU 400 defined by using both alternatives 1 and 2 at the same time, as illustrated in FIG. 14. In this example, a same STA may use (i.e., is allocated) a MRU 400 defined by (mixed) alternatives 1 and 2, while all other STAs use, e.g., alternative 2.

FIG. 15 shows a method 1500 according to an embodiment of the disclosure. The method 1500 is for resource allocation, and may be performed by the wireless network device 300. The method 1500 comprises a step 1501 of defining a non-contiguous MRU 400 in the bandwidth of a channel 301. The channel 301 comprises a plurality of RUs 401. Further, the MRU 400 is defined based on non-punctured RUs 401 after puncturing one or more of the RUs, i.e. by obtaining one or more punctured RUs 401*p* of the channel 301 and/or is defined by aggregating two or more non-adjacent RUs 401 of the channel 301. Further, the method 1500 comprises a step 1502 of allocating the MRU 400 to a wireless station 303 (STA).

In summary, it is suggested to expand and improve the method of utilizing the channel resources in the 802.11be standard, by allowing the use of multiple and non-contiguous portions (RUs 401) of the channel 301 to define a MRU 400. Supporting an MRU 400 and non-contiguous RUs 401 to be allocated to the same STA 303 improves the channel utilization by making it more efficient, due to enhancing the capability of leveraging the channel selectivity. Improving the usage of the channel 301 may increase the overall system throughput and performance.

In particular, the 802.11ax RU definition is far from being optimal. In particular, the inability to aggregate MRUs for the same STA makes the channel utilization sub-optimal especially in two common cases: when channel puncturing exists; and when the channel is selective.

The present disclosure presents two alternatives 1 and 2 to apply an MRU 400 per STA without adding overhead to MU-PPDU, and by adding only a small amount of overhead to SU-PPDU. By allowing puncturing in SU-PPDU, and by allowing the use of non-contiguous RUs, the channel utilization for SU-PPDU can be significantly improved.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A wireless network device for resource allocation, the wireless network device comprising a processor configured to:
   define a non-contiguous multiple resource unit (MRU) in a bandwidth of a channel, wherein the channel comprises a plurality of resource units (RUs), and wherein the non-contiguous MRU is defined based on non-punctured RUs after puncturing one or more of the RUs of the channel; and
   allocate the non-contiguous MRU to a wireless station.

2. The wireless network device according to claim 1, wherein:
   the RUs are sub-channels.

3. The wireless network device according to claim 2, wherein:
   the channel comprises one, two, three or four 80 MHz segments, and each 80 MHz segment comprises four 20 MHz sub-channels.

4. The wireless network device according to claim 1, wherein:
   the RUs each comprise a plurality of contiguous frequency tones.

5. The wireless network device according to claim 4, wherein:
   the frequency tones each have a 78.125 kHz bandwidth.

6. The wireless network device according to claim 1, wherein:
   the non-contiguous MRU comprises one 26-tone RU and one 52-tone RU; or
   the non-contiguous MRU comprises one 26-tone RU and one 106-tone RU; or
   the non-contiguous MRU comprises one 242-tone RU and one 484-tone RU.

7. The wireless network device according to claim 1, wherein the non-contiguous MRU comprises at least one of the following:
   at least two contiguous parts; or
   at least two non-contiguous parts.

8. The wireless network device according to claim 1, wherein the processor is further configured to cause the wireless network device to transmit a packet to the wireless station utilizing the non-contiguous MRU.

9. The wireless network device according to claim 8, wherein a preamble of the packet comprising information indicating the RUs comprises at least one of the following:
   RUs that are used; or
   RUs that are non-punctured; or
   RUs that are punctured.

10. The wireless network device according to claim 9, wherein:
    the packet is a physical layer conformance procedure (PLCP) protocol data unit (PPDU), and the information is included in a Universal Signaling (U-SIG) field or an Extremely High Throughput Signaling (EHT-SIG) field of the preamble of the packet.

11. The wireless network device according to claim 10, wherein:
    the packet is a multi-user PPDU; and
    the EHT-SIG field of the multi-user PPDU comprises a sub-field for each of one or more wireless stations, and the information is included in the sub-field associated with the wireless station to which the packet is transmitted utilizing the non-contiguous MRU.

12. The wireless network device according to claim 10, wherein:
    the packet is a single-user PPDU or multi-user PPDU; and
    the information is included as a bitmap in the U-SIG field of the single-user PPDU or multi-user PPDU.

13. The wireless network device according to claim 1, wherein:
    the wireless network device is an access point of a wireless network.

14. A method for resource allocation, the method comprising:
    defining a non-contiguous multiple resource unit (MRU) in a bandwidth of a channel, wherein the channel comprises a plurality of resource units (RUS), and wherein the non-contiguous MRU is defined based on non-punctured RUs after puncturing one or more of the RUs of the channel; and
    allocating the non-contiguous MRU to a wireless station.

15. The method according to claim 14, wherein:
    the RUs are sub-channels.

16. The method according to claim 15, wherein:
    the channel comprises one, two, three or four 80 MHz segments, and each 80 MHz segment comprises four 20 Mhz sub-channels.

17. The method according to claim 14, wherein:
    the RUs each comprise a plurality of contiguous frequency tones.

18. The method according to claim 17, wherein:
    the frequency tones each have a 78.125 kHz bandwidth.

19. The method according to claim 14, wherein:
    the non-contiguous MRU comprises one 26-tone RU and one 52-tone RU; or
    the non-contiguous MRU comprises one 26-tone RU and one 106-tone RU; or
    the non-contiguous MRU comprises one 242-tone RU and one 484-tone RU.

20. The method according to claim 14, wherein the non-contiguous MRU comprises at least one of the following:
    at least two contiguous parts; or
    at least two non-contiguous parts.

21. The method according to claim 14, further comprising:
    transmitting a packet to the wireless station utilizing the non-contiguous MRU.

22. The method according to claim 21, wherein:
    a preamble of the packet comprises information indicating the RUs, wherein the RUs comprise at least one of the following:
    RUs that are used; or
    the non-punctured RUs; or
    RUs that are punctured.

23. The method according to claim 22, wherein:
    the packet is a physical layer conformance procedure (PLCP) protocol data unit (PPDU), and the information is included in a Universal Signaling (U-SIG) field or an Extremely High Throughput Signaling (EHT-SIG) field of the preamble of the packet.

24. The method according to claim 23, wherein:
    the packet is a multi-user PPDU; and
    the EHT-SIG field of the multi-user PPDU comprises a sub-field for each of one or more wireless stations, and the information is included in the sub-field associated with the wireless station to which the packet is transmitted utilizing the non-contiguous MRU.

25. The method according to claim 23, wherein:
the packet is a single-user PPDU or multi-user PPDU; and
the information is included as a bitmap in the U-SIG field
of the single-user PPDU or multi-user PPDU.

26. The method according to claim 14, wherein:
the method is executed in an access point of a wireless
network.

\* \* \* \* \*

UNITED STATES PATENT AND TRADEMARK OFFICE
CERTIFICATE OF CORRECTION

| | | |
|---|---|---|
| PATENT NO. | : 12,323,342 B2 | Page 1 of 1 |
| APPLICATION NO. | : 18/818551 | |
| DATED | : June 3, 2025 | |
| INVENTOR(S) | : Redlich et al. | |

It is certified that error appears in the above-identified patent and that said Letters Patent is hereby corrected as shown below:

In the Claims

Claim 14: Column 12, Line 16: "comprises a plurality of resource units (RUS), and" should read as -- comprises a plurality of resource units (RUs), and --.

Signed and Sealed this
Twenty-first Day of October, 2025

John A. Squires
*Director of the United States Patent and Trademark Office*